July 8, 1930.  J. M. G. FULLMAN  1,769,947
CONNECTER FOR ELECTRICAL CONDUITS
Filed July 26, 1928
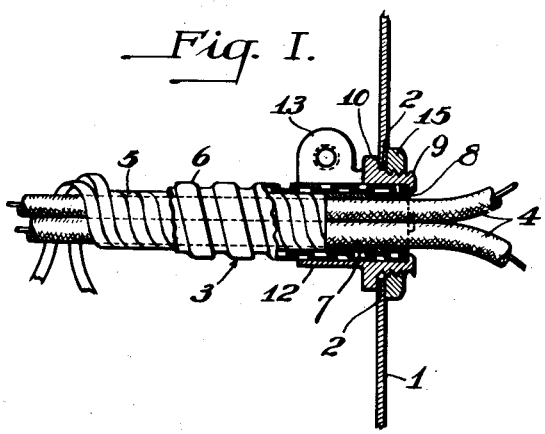
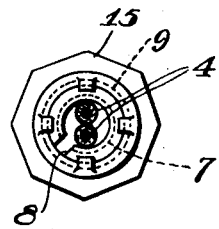
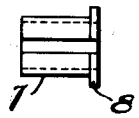
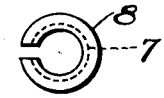
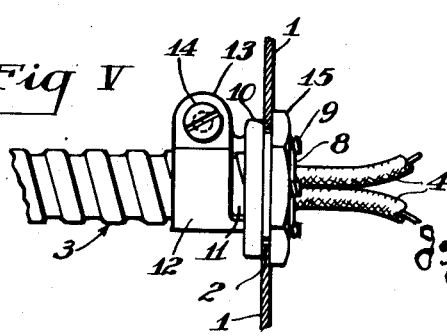
WITNESS
A.B.Wallace.
INVENTOR
James M. G. Fullman
McChristy & Christy,
Attys.

UNITED STATES PATENT OFFICE

JAMES M. G. FULLMAN, OF SEWICKLEY, PENNSYLVANIA, ASSIGNOR TO NATIONAL METAL MOLDING COMPANY, OF PITTSBURGH, PENNSYLVANIA, A CORPORATION OF PENNSYLVANIA

CONNECTER FOR ELECTRICAL CONDUITS    REISSUED

Application filed July 26, 1928. Serial No. 295,550.

In connecting electrical conduits and armored cables to outlet boxes and other electrical fittings it is usual to cut away the conduit wall or the sheath of the cable and to pass the unsheathed conductors into the box for making the desired electrical connections. In the use of metallic conduits, and particularly in the case of so-called flexible metallic armored cable, this leaves a more or less ragged metallic edge which often abrades or cuts into the insulation on the exposed conductors, and is likely to cause short circuits and other injurious effects. In order to shield the exposed conductors from the edge of the cut-away metallic armor it has been proposed recently to provide a bushing of insulating material which can be slipped over the exposed conductors where the armor is cut away, and having a shoulder bearing against the sharp metallic edge of the armor, as shown and described in Letters Patent No. 1,687,013, dated October 9th, 1928. When such a bushing is used at the joint between an armored cable and an outlet box with connecters of the present usual types, it is largely or altogether hidden within the connecter, so that its presence is not apparent to an inspector or other observer. The present invention provides an improved connecter binding the cable to the outlet box, and having means for holding the insulating and protective bushing in place, which will permit the bushing to be visible, and thus permit ready inspection of the system.

In the accompanying drawings Figure 1 is a sectional elevation of an armored cable provided with an insulating bushing in its throat and joined to an outlet box by my improved connecter. Figure 2 is a front elevation of the structure shown in Figure 1. Figure 3 is a view of the bushing in elevation, and Figure 4 is a front view thereof. Figure 5 is a view of the cable and connecter in elevation, as shown in Figure 1.

The wall of the outlet box is designated by the numeral 1, and the usual outlet opening by the numeral 2. The flexible armored cable 3 herein shown is of the well known type. The conductors 4 have wound upon them a jacket 5 of helically coiled strips of fibrous material, such as paper, and the metallic armor 6 is coiled tightly around the jacketed conductors. When the edge of the armor 6 has been cut away, the jacket 5 is unwound for a suitable distance and broken off, thus leaving an annular space around the conductors within the armored cable back of the cut-away edge. Into this space there is slipped around the conductors the split tubular bushing 7 formed of insulating material and having at its outer edge the integral shoulder 8 which bears against the cut-away edge of the armor, leaving the exposed conductors 4 projecting therefrom. The connecter may be of a variety of suitable forms, but for purposes of illustration I have shown herein the usual pinch connecter having a forward cylindrical threaded portion 9 projecting through the opening in the outlet box, with the shoulder 10 bearing against the outer face of the wall of the box, the transverse slit 11, and the rearwardly projecting bifurcated barrel portion 12 having the opposite ears 13 connected by the binding screw 14, by means of which the bifurcated barrel portion is caused to pinch the armored cable tightly. The connecter is held in place in the opening by means of the lock nut 15 screwed upon the threaded inner portion 9 and bearing aganist the inner face of the wall of the box.

In order to retain the bushing in place in such a way that it will be visible to an observer, the connecter is provided at the inner edge of the portion 9 with a plurality of inwardly projecting fingers which overhang and bear upon the outer face of the shoulder 8 of the bushing, preventing its displacement, while at the same time the bushing between the fingers is readily visible to an inspector or other observer. In fact, as shown in Figures 1 and 5, the shoulder of the bushing projects slightly beyond the side edge of the lock nut 15, so that it can be seen from the side as well as from the front. This is of considerable practical advantage in the installation and inspection of electrical conduit systems of this type.

It will be understood that the specific form of the connecter may be varied, and it will also be understood that while the invention is of particular advantage in the use of flexible metallic armored cables, it may be used to advantage in the installation of electrical conduits of other forms.

I claim as my invention:

1. The combination with an armored cable, of a bushing of insulating material having a tubular barrel portion contained within the cable armor and a shoulder bearing against the end of the armor, and a connecter and means for securing it to the cable, said connecter having a portion projecting beyond the end of the cable armor and having inwardly projecting fingers adapted to bear upon the bushing shoulder and retain the bushing in place.

2. The combination with an electrical conduit, of a bushing having a tubular barrel portion contained within the conduit and a shoulder bearing against the end of the conduit, and a connecter and means for securing it to the conduit, said connecter having means for retaining the bushing in place while leaving it visible to ocular inspection.

In testimony whereof I have hereunto set my hand.

JAMES M. G. FULLMAN.

DISCLAIMER 1,769,947.—*James M. G. Fullman*, Sewickley, Pa. CONNECTER FOR ELECTRICAL CONDUITS. Patent dated July 8, 1930. Disclaimer filed August 19, 1938, by the assignee, *National Electric Products Corporation*, and the exclusive licensee, *The Thomas & Betts Co.*

Hereby enter this disclaimer to claim 2 in said specification.

[*Official Gazette September 6, 1938.*]